United States Patent
Wang et al.

(10) Patent No.: US 7,580,393 B2
(45) Date of Patent: Aug. 25, 2009

(54) PROBE RESPONSE DETERMINATION

(75) Inventors: Huizhao Wang, San Jose, CA (US);
Roman M. Arutyunov, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 376 days.

(21) Appl. No.: 11/541,815

(22) Filed: Oct. 2, 2006

(65) Prior Publication Data

US 2008/0080387 A1    Apr. 3, 2008

(51) Int. Cl.
*H04W 4/00* (2006.01)
(52) U.S. Cl. ....................... 370/332; 455/515
(58) Field of Classification Search ................ 370/338, 370/331
See application file for complete search history.

(56) References Cited

U.S. PATENT DOCUMENTS

| | | | |
|---|---|---|---|
| 2004/0008663 A1 * | 1/2004 | Srikrishna et al. ........... 370/351 |
| 2004/0202141 A1 | 10/2004 | Sinivaara et al. |
| 2004/0218568 A1 * | 11/2004 | Goodall et al. ............. 370/332 |
| 2004/0236850 A1 | 11/2004 | Krumm et al. |
| 2005/0271021 A1 * | 12/2005 | Alemany et al. ............ 370/338 |
| 2006/0089964 A1 | 4/2006 | Pandey et al. |
| 2006/0092883 A1 | 5/2006 | Lee et al. |
| 2007/0197246 A1 * | 8/2007 | Julian ........................ 455/515 |

* cited by examiner

*Primary Examiner*—Huy D. Vu
*Assistant Examiner*—Michael J Digiovanni
(74) *Attorney, Agent, or Firm*—Brian R. Short

(57) ABSTRACT

An apparatus and method of a method of an access point determining whether to transmit a response to a client device probe request is disclosed. The method includes the access point receiving a probe request from a client device. The access point determines a quality of a link between the access point and the client device based on the probe request. The access point sets a delay time for transmitting a probe response to the probe request depending upon the quality of the link.

16 Claims, 5 Drawing Sheets

PROBE RESPONSE DETERMINATION

FIELD OF THE INVENTION

The invention relates generally to wireless communications. More particularly, the invention relates to a method and apparatus of suppressing the number of probe responses of a wireless network in response to a wireless client device probe request.

BACKGROUND OF THE INVENTION

FIG. 1 shows a prior art wireless network that includes access points 120, 122, 124, 126. The access points 120, 122, 124, 126 are wire connected to a wired network 110, which can be connected to the internet 100. A client device 150 initiates a wireless connection to one of the access points 120, 122, 124, 126 by broadcasting a probe request. As shown, the probe request can be received by multiple access points 120, 122, 124, 126. The access points that receive the probe request respond with a probe response. Based on the probe responses, the client device selects one of the access points to associate with, providing the client device 150 with wireless access to the wireless network 110.

If the client device 150 is located proximate to many access points, the client device 150 can receive many probe responses. In addition to adding data traffic to the available transmission channel, the existence of many probe response can confuse the client device 150. Additionally, wireless connections are subject to environmental conditions that make the connections less reliable than wired connections. As a result, client devices may not do a very good job at selecting which access point to associate with. That is, the client device may select an access point that provides an inferior wireless connection as compared to another available access point.

The client device may base its selection to some extent upon the signal strengths of probe responses received from the access points. This strength, however, only reflects the quality of the wireless connection directed towards the client device. The strength does not necessarily provide an accurate indication of the quality of the wireless connection directed from the client device to the access point.

It is desirable to have an apparatus and method for suppressing probe responses of a wireless network, and allow a client device to improve access point selections.

SUMMARY OF THE INVENTION

One embodiment of the invention includes a method of an access point determining whether to transmit a response to a client device probe request. The method includes the access point receiving a probe request from a client device. The access point determines a quality of a link between the access point and the client device based on the probe request. The access point sets a delay time for transmitting a probe response to the probe request depending upon the quality of the link.

Another embodiment of the invention includes a method of determining which of a plurality of access points has a highest quality link with a client device. The method includes at least one of the plurality of access points receiving a probe request from the client device. Each access point that receives the probe request, estimates a link quality between the access point and the client device. Each access point that receives the probe request, delays a probe response depending upon the link quality between the access point and the client device.

Another embodiment of the invention includes a method of an access node within a wireless mesh network determining whether to transmit a response to a client device probe request. The method includes the access node receiving a probe request from a client device. The access node determines a quality of a link between the access node and the client device based on the probe request. The access point sets a delay time for transmitting a probe response to the probe request depending upon the quality of the link; wherein the probe response includes the quality of the link.

Other aspects and advantages of the present invention will become apparent from the following detailed description, taken in conjunction with the accompanying drawings, illustrating by way of example the principles of the invention.

DETAILED DESCRIPTION

Figure 1:
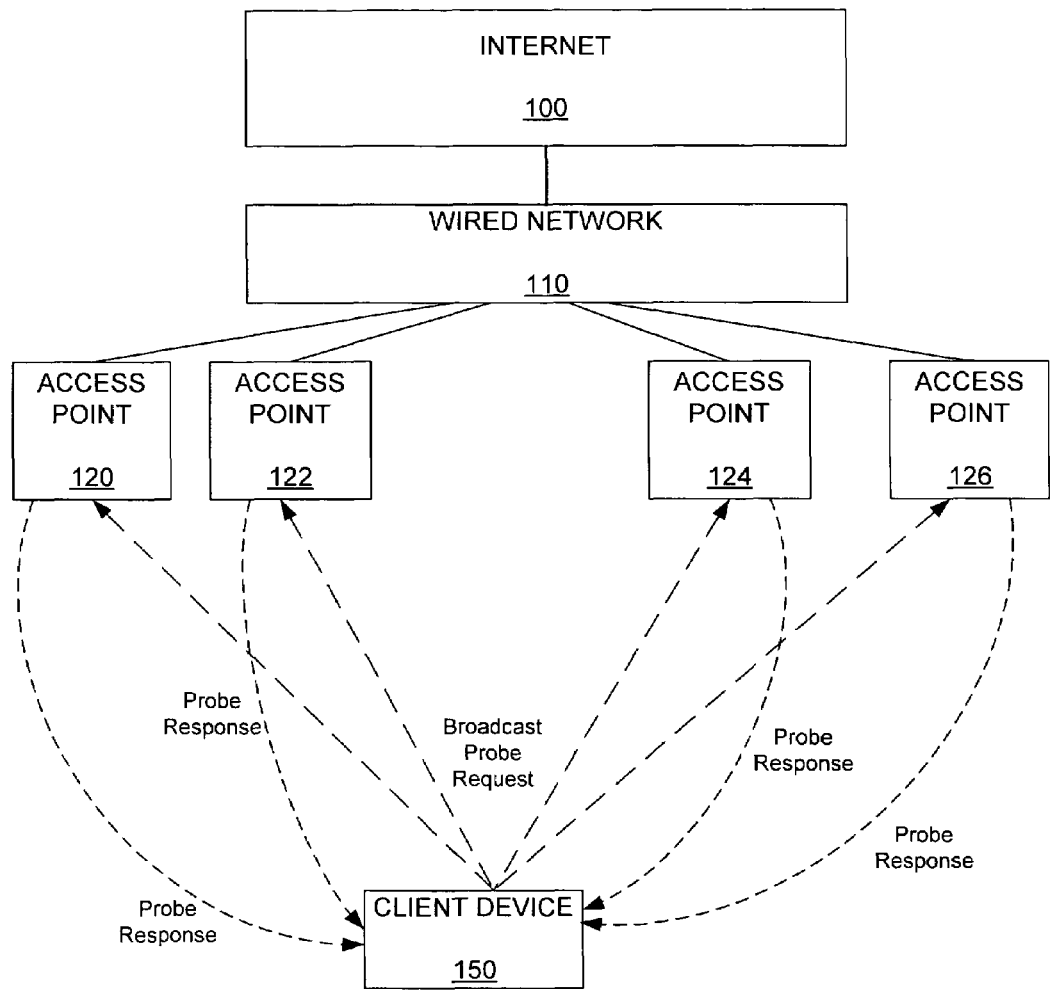
FIG. 1 shows a prior art wireless network that includes several access points.

As shown in the drawings for purposes of illustration, the invention is embodied in an apparatus and method for wireless networks and wireless mesh networks that delays and suppresses probe response of access points and access nodes, based on a link quality between the access points or access nodes and a client device. By delaying and suppressing the probe responses, client devices that have not yet associated with a network can select association with an access point or access node of the network having a link quality with the client device that is better than the link quality between the client device and other access points or access nodes. The client device can have no history of association with the access point or access node.

Figure 2:
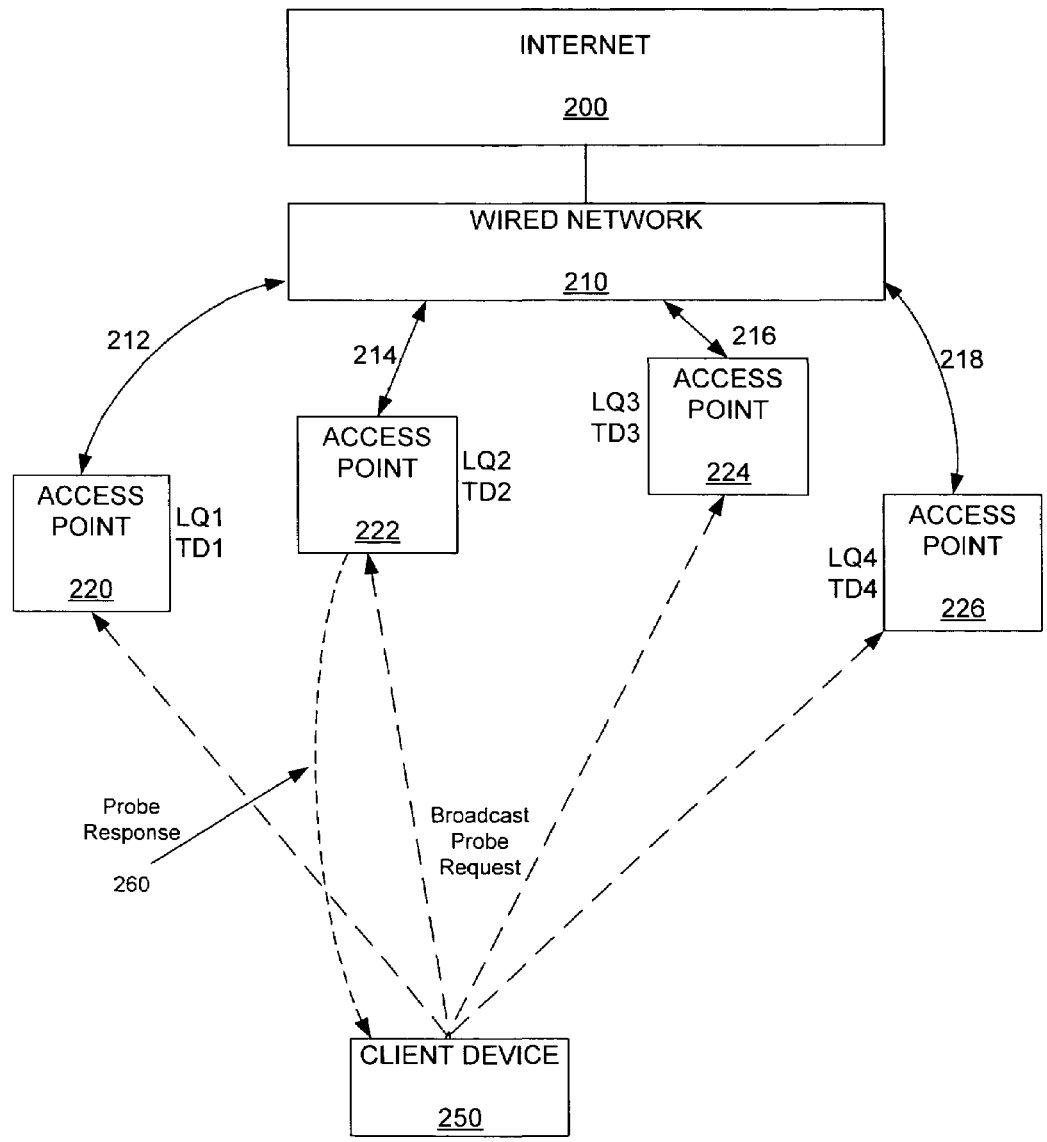
FIG. 2 shows an example of a wireless network that includes each access point that receives a probe request from a client device, delaying a response to a probe request based on a link quality between the access point and the client device.

FIG. 2 shows an example of a wireless network that includes access points 220, 222, 224, 226. Each access point that receives a probe request, estimates a link quality between the access point and the client device, and sets a delay time for a response based on the link quality. If the access point does not receive a probe response from another access point within the delay time, or if the access point receives a probe request sent by another access point that has a worse link quality (that is, the link quality between the other access point and the client device is worse than the link quality between the access point and the client device), the access point transmits a probe response back to the client device.

Generally, each access point (or access node) of a network estimates a link quality between a client device and the access point. Each access point delays a response to the probe request, in which the delay is proportional to the link quality. Therefore, the access point having the best link quality will typically respond first. The other access points will generally receive the response as well, and therefore, suspend their responses. In some cases, a first access point will respond before a second access point, when the second access point actually has a better (at least slightly) link quality (between the second access point and the client device) than the first access point. In this case, the second access point can ignore the response of the first access point, and respond to the client device probe request anyway.

The probe responses of the access point include information that reflects the quality of the link between the access point and the client device. This allows neighboring access points to assess the quality of the links of each other access point by receiving the probe response(s) of the neighboring access points.

The link quality between each access point and the client device can be estimated by a received signal strength of the probe request. This estimate can be included within the probe responses in the form of a received signal strength indicator (RSSI). The link quality can additionally be influenced by network quality parameters of the access points or access nodes of the wireless network as will be described. The network quality parameter can be included along with the RSSI, or the RSSI value can be modified to reflect the network quality parameter.

The access points of FIG. 2 can be wired connected through connections 212, 214, 216, 218 to a wired network 210. The wired network 210 can be connected, for example, to the internet 200.

More than one access point, such as, access points 220, 222, 224, 226 receive probe requests from a client device 250. Each access point that receives the probe estimates a quality of the wireless link between the client device 250 and the receiving access point. For each receiving access point, the quality of the link can be determined, for example, by measuring the received signal strength of the probe request. That is, the signal strength of the probe request is to at least some extent dependent upon the quality of the transmission link between the client device transmitting the probe request, and the device receiving the probe request. Generally, the greater the received signal strength, the better the quality of the link between the client device and the receiving device.

Wireless network parameters, however, can also influence the desirability of one network device (gateways, access node or access point) over another network device. For example, data throughput, latency, backhaul bandwidth and stability of the access point can also be useful in determining which probe request receiving access point should be connected to the probe request transmitting client device. Therefore, the link quality that is communicated from an access point (or access node) can additionally include one or more network parameters associated with the access point. An embodiment includes the link quality (for example, an RSSI measurement) being modified to reflect one or more network quality parameters associated with the access point.

As previously stated, the access points 220, 222, 224, 226 can receive a probe request from the client device 250. Each access point can estimate a link quality between the access point and the client device 250 by measuring, for example, a receive signal strength of the probe request. Based on the estimated signal quality, each access point 220, 222, 224, 226 sets a delay time for transmitting a response to the probe request of the client device. For example, as shown in FIG. 2, a first access point 220 determines a link quality of LQ1 and sets a time delay of TD1. A second access point 222 determines a link quality of LQ2 and sets a time delay of TD2. A third access point 224 determines a link quality of LQ3 and sets a time delay of TD3. A fourth access point 226 determines a link quality of LQ4 and sets a time delay of TD4.

The time delays can be determined estimating the link quality, and accessing a look up table to determine a delay time based on the link quality. For estimated link qualities that are on the edge (that is, near a threshold in which the delay is one value or another) two different values of delay time can result. Therefore, two different access points having approximately the same link quality can end up having different delay times.

As previously described, the access point that responds first will cancel the responses of all the other access point, unless one of the other access point has a better link quality, but for some reason has a greater time delay. The other access point will transmit a response if it determines it has a better link quality.

Figure 3:
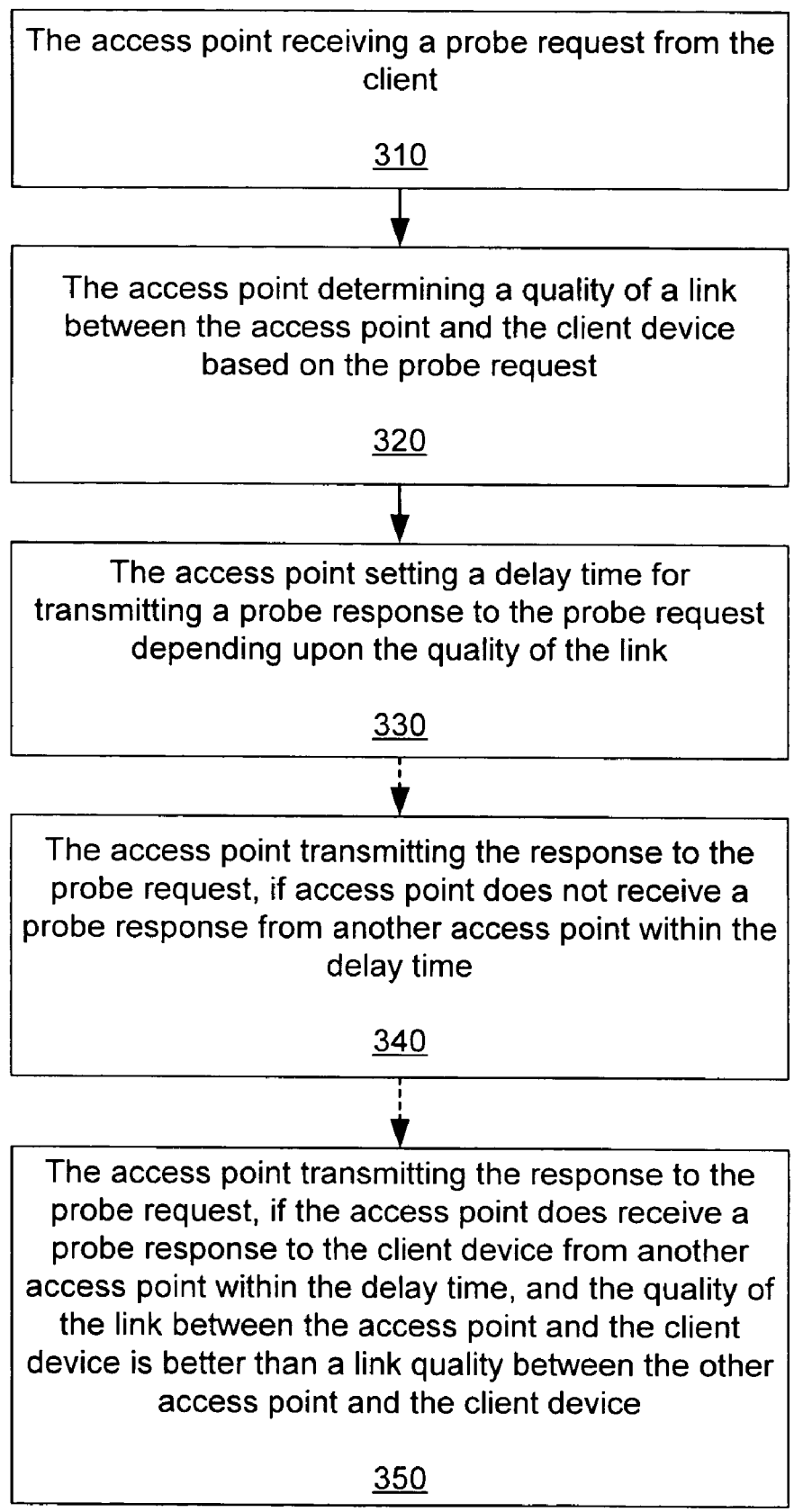
FIG. 3 is a flow chart that includes steps of one example of a method of an access point determining whether to transmit a response to a client device probe request.

FIG. 3 is a flow chart that includes steps of one example of a method of suppressing access point probe response. A first step 310 includes the access point receiving a probe request from a client device. A second step 320 includes the access point determining a quality of a link between the access point and the client device based on the probe request. A third step 330 includes the access point setting a delay time for transmitting a probe response to the probe request depending upon the quality of the link.

As previously described, the quality of the link can be determined by a receive signal strength of the probe response. The link quality can be additionally based on a network quality parameter of the access point.

The access point communicates (through its probe response) the quality of the link between the access point and the client device. This allows the access points of the network to determine which of the access points has the best link quality. The access point with the best link quality typically responds to the probe request. The process allows the client device to make a better selection than if all of the access points were to respond with a probe response. Additionally, the method reduces the number of probe responses, which improves air-time usage of the available transmission channels.

FIG. 3 shows additional steps that can be included to aid the access point in determining if it has the best link quality to the client device. The additional steps include a fourth step 340 that includes the access point transmitting the response to the probe request, if access point does not receive a probe response from another access point within the delay time. This suggests to the access point that it has the best link quality with the client device because it responded first.

A fifth step 350 includes the access point transmitting the response to the probe request, if the access point does receive a probe response to the client device from another access point within the delay time, and the quality of the link between the access point and the client device is better than a link quality between the other access point and the client device. This allows the access point to over-ride the response of another access point if the access point actually has a better link quality than the other access point.

Figure 4:
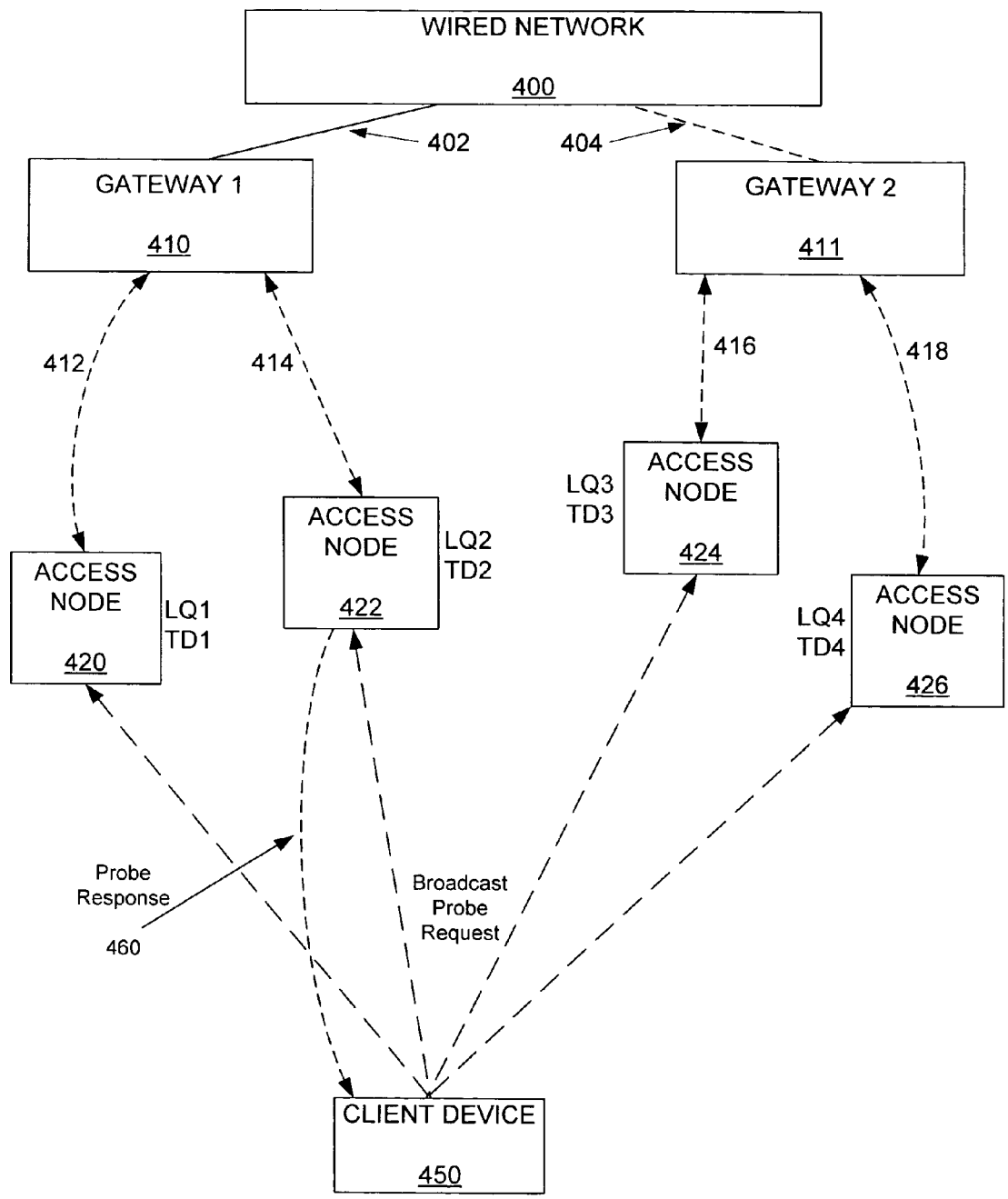
FIG. 4 shows an example of a wireless mesh network that includes each access node that receives a probe request from a client device, delaying a response to a probe request based on a link quality between the access node and the client device.

FIG. 4 shows an example of a wireless mesh network that includes each access node that receives a probe request from a client device, delaying a response to a probe request based on a link quality between the access node and the client device. As will be described, this provides for a suppression of probe response, and provides the client device a probe response from the access node having the best link quality with the client device.

The wireless mesh network includes gateways 410, 411 that can be wire or wirelessly connected (connections 402, 404) to a wired network 400, and provide the access nodes 420, 422, 424, 426 with access to the wired network 400. The wired network 400 can be connected, for example, to the internet.

As will be described, the access nodes 420, 422, 424, 426 select route to the gateways 410, 411. As shown in FIG. 4, the access node 420 is wirelessly connected through a link 412 to the gateway 410, the access node 422 is wirelessly connected through a link 414 to the gateway 410, the access node 424 is wirelessly connected through the link 416 to the gateway 411, and the access node 426 is wirelessly connected to through the link 418 to the gateway 411. A default gateway of an access node is the gateway that the access node has select as having the best routing path.

The gateways 410, 411 and the access nodes 420, 422, 424, 426 can all provide a client device (such as, client device 450) with wireless access to the wired network 400. The methods of probe response suppression described for access node are applicable for gateways as well. The term "access node" is used here for nodes within a wireless mesh network as opposed to the "access points" of the wireless network of FIG. 2. The terms can be interchanged. The distinction here is between a wireless network and a wireless mesh network.

Initial link quality estimates of the wireless mesh network of FIG. 4 can be made is a similar fashion as the initial link quality estimates of the wireless mesh network of FIG. 2. More specifically, each access node estimates the quality of the wireless link between the access node and the client device by measuring the signal strength of probe requests received from the client device 450. The link quality estimates can also include wireless mesh network quality parameters of the access nodes within the wireless mesh network.

Mesh Network Quality Parameter

One example of a mesh network quality parameter is an indicator of a path quality of the access node to a gateway of the mesh network. As shown in FIG. 4, routing paths exist between access nodes of a mesh network and default gateways. The quality of the paths can vary from access node to access node. The quality of the routing path can influence, for example, the data throughput and latency for data communication between the access node and the gateway. This in turn, effects the data communication of any client that associates with the access node. Therefore, providing the mesh network path quality of each access node within communication between neighboring access nodes allows for a better selection of which access node has the best quality link with a client device.

The path quality can include both an upstream direction path quality (towards the default gateway) and a downstream direction path quality (away from the default gateway). As will be described, the downstream link quality can be determined by a persistence of successfully received routing packets.

Another wireless network quality parameter that can be useful includes an indicator of a bandwidth of a backhaul connection. If the connecting device is a gateway or an access point, the backhaul is typically the connection between the connecting device and the wired network. If the connecting device is an access node, the backhaul is the connection between the default gateway of the access node and the wired network.

Mesh networks can include fixed and mobile access nodes. Mobile access nodes are typically less reliable because of the changing condition of their wireless links (upstream and/or downstream). Therefore, another useful mesh network qual- ity parameter is an indicator of whether the access node is a mobile access node or a fixed access node.

Mesh networks include some form of latency between, for example, an access node of the mesh network and the corresponding default gateway. More specifically, the latency can be for the data path between the access node and its default gateway. The latency can vary form one access node to another. Once the access node knows its latency, it can indicate the latency through the latency indicator, which can be include as or within the mesh network quality parameter.

Routing Selections

As previously described, the quality of an upstream path from an access node to a default gateway can be determined during routing selection by the access node. An embodiment of the mesh network includes gateways originating and broadcasting routing beacons at a predetermined rate (such as 4 beacons per second). Each first level access node (such as access nodes 420, 422, 424, 424) receive routing beacons from at least one of the gateways 410, 411. By knowing the original rate in which the beacons are broadcast from the gateways, and the rate at which routing beacons are successfully received, the receiving access node can determined the persistence of successfully received routing beacons. An embodiment includes each first level access node selecting an upstream gateway based on a persistence of successfully received routing beacons.

Each first level access node can then rebroadcast the successfully received routing beacons. The rebroadcast beacons can include additional information allowing second level access nodes (not shown) that receive the rebroadcast routing beacons to determine a routing path back to a gateway. The additional information can include identification (for example, an address) of the first level access node or a hop count (hop count indicates the number of wireless links an access node is from a gateway).

The mesh network can include any number of gateways and any number of access nodes. The number of wireless hops include within the wireless mesh network is not limited.

As previously stated, the persistence of received routing beacons can be used to select a routing path to a gateway. The persistence reflects that quality of the routing path to a gateway, and can be used to provide routing path quality within probe responses transmitted by each access node.

The routing path quality can be determined in both the downstream direction (away from the default gateway) and the upstream direction (towards the default gateway). The downstream quality can be determined by receiving routing beacons as described. The upstream quality can be determined by an upstream device (access node or gateway) receiving routing beacons from the access node, determining the persistence of successfully received beacons, and then including this information in the beacons that the upstream device broadcasts, and are received by the access node.

More than one access node, such as, access nodes 420, 422, 424, 426 receive probe requests from a client device 450. Each access node that receives the probe estimates a quality of the wireless link between the client device 450 and the receiving access node. For each receiving access node, the quality of the link can be determined, for example, by measuring the received signal strength of the probe request. That is, the signal strength of the probe request is to at least some extent dependent upon the quality of the transmission link between the client device transmitting the probe request, and the device receiving the probe request. Generally, the greater the received signal strength, the better the quality of the link between the client device and the receiving device.

Wireless network parameters, however, can also influence the desirability of one network device (gateway or access node) over another network device. For example, data throughput, latency, backhaul bandwidth and stability of the access node can also be useful in determining which probe request receiving access node should be connected to the probe request transmitting client device. Therefore, the link quality that is communicated within a probe response can additionally include one or more network parameters associated with the access node. An embodiment includes the link quality (for example, an RSSI measurement) being modified to reflect one or more network quality parameters associated with the access node. That is, the value of the RSSI can be modified to reflect the quality of the one or more network quality parameters.

As previously stated, the access nodes 420, 422, 424, 426 can receive a probe request from the client device 450. Each access node can estimate a link quality between the access node and the client device 450 by measuring, for example, a receive signal strength of the probe request. Based on the estimated signal quality, each access point 420, 422, 424, 426 sets a delay time for transmitting a response to the probe request of the client device. For example, as shown in FIG. 4, a first access node 420 determines a link quality of LQ1 and sets a time delay of TD1. A second access node 422 determines a link quality of LQ2 and sets a time delay of TD2. A third access node 424 determines a link quality of LQ3 and sets a time delay of TD3. A fourth access node 426 determines a link quality of LQ4 and sets a time delay of TD4.

The time delays can be determined estimating the link quality, and accessing a look up table to determine a delay time based on the link quality. For estimated link qualities that are on the edge (that is, near a threshold in which the delay is one value or another) two different values of delay time can result. Therefore, two different access nodes having approximately the same link quality can end up having different delay times.

As previously described, the access node that responds first will cancel the responses of all the other access nodes, unless one of the other access node has a better link quality, but for some reason in responding later. The other access nodes will transmit a response if it determines it has a better link quality.

Figure 5:
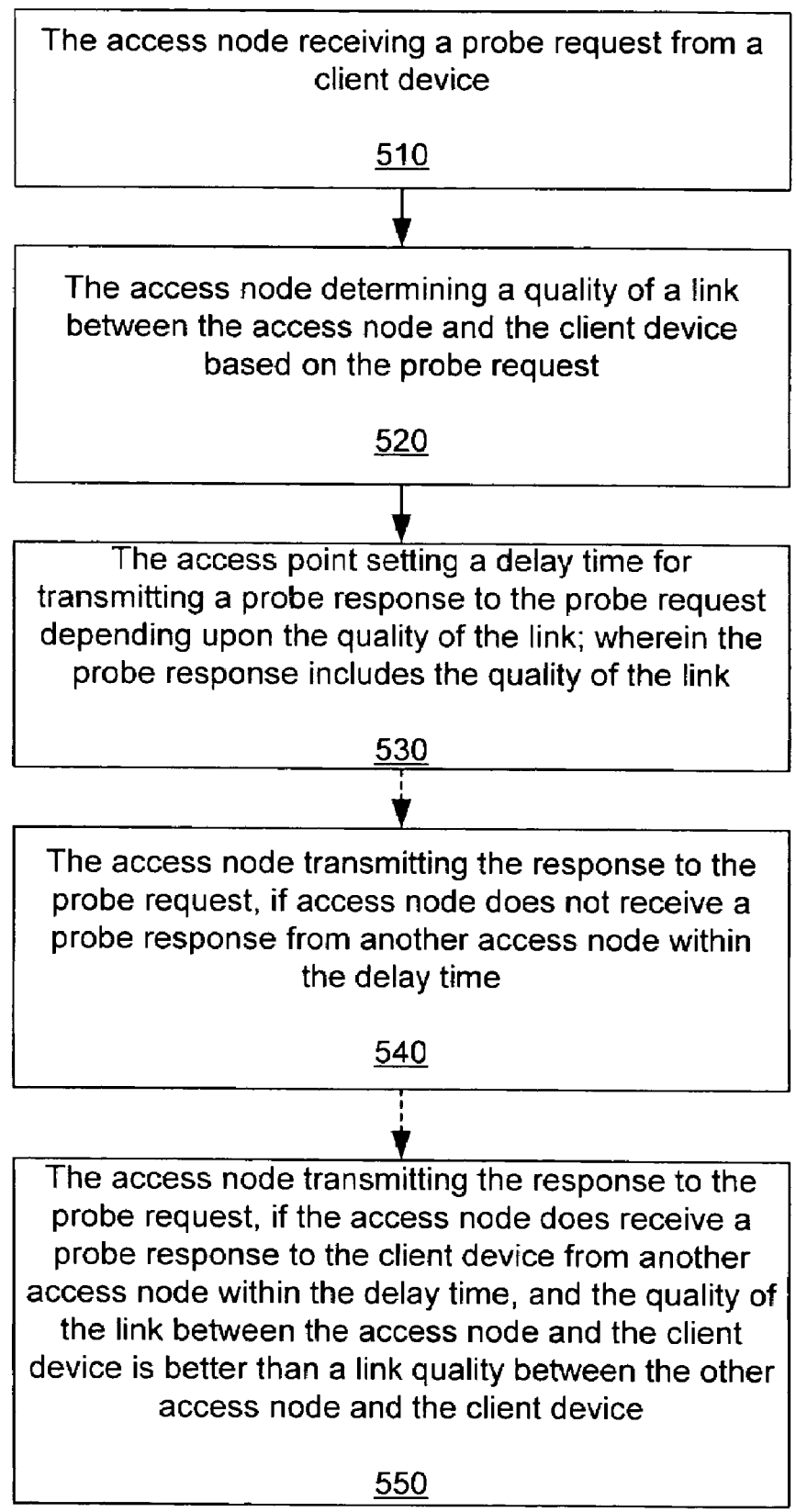
FIG. 5 is a flow chart that includes steps of one example of a method of an access node of a wireless mesh network determining whether to transmit a response to a client device probe request.

FIG. 5 is a flow chart that includes steps of one example of a method of an access node within a wireless mesh network determining whether to transmit a response to a client device probe request. A first step 510 includes the access node receiving a probe request from a client device. A second step 520 includes the access node determining a quality of a link between the access node and the client device based on the probe request. A third step 530 includes the access point setting a delay time for transmitting a probe response to the probe request depending upon the quality of the link; wherein the probe response includes the quality of the link.

As previously described, the quality of the link between the access node and the client device can be determined based on the probe request by measuring a received signal strength of the probe request. The link quality can be communicated to neighboring access node be transmitting the RSSI of the probe request. Additionally, a wireless mesh network quality parameter can be communicated to the neighboring access nodes. Exemplary wireless mesh network quality parameters include a path quality of the access node to a wireless mesh network gateway, a latency of the access node, and/or a backhaul bandwidth of the access node.

FIG. 5 shows additional steps that can be included to aid the access node in determining if it has the best link quality to the client device. The additional steps include a fourth step 540 that includes the access node transmitting the response to the probe request, if access node does not receive a probe response from another access node within the delay time.

A fifth step 550 includes the access node transmitting the response to the probe request, if the access node does receive a probe response to the client device from another access node within the delay time, and the quality of the link between the access node and the client device is better than a link quality between the other access node and the client device.

Each access node of a wireless network that operating as described, ensures that the proper probe request receiving access node responds to the probe request of the client device. Transmission channel air-time usage is minimized because only a single access node responds to the probe request.

Although specific embodiments of the invention have been described and illustrated, the invention is not to be limited to the specific forms or arrangements of parts so described and illustrated. The invention is limited only by the appended claims.

What is claimed:

1. A method of an access point determining whether to transmit a response to a client device probe request, comprising:
   the access point receiving a probe request from a client device;
   the access point determining a quality of a link between the access point and the client device based on the probe request;
   the access point setting a delay time for transmitting a probe response to the probe request depending upon the quality of the link;
   the access point transmitting the response to the probe request, if the access point does receive a probe response to the client device from another access point within the delay time, and the quality of the link between the access point and the client device is better than a link quality between the other access point and the client device.

2. The method of claim 1, further comprising including an indicator of the quality of the link between the access point and the client device within the probe response.

3. The method of claim 2, wherein the indicator comprises a receive signal strength of the probe request from the client device.

4. The method of claim 3, wherein the indicator further comprises a network quality parameter of the access point.

5. The method of claim 3, wherein the indicator includes the received signal strength modified according to the network quality parameter.

6. A method of determining which of a plurality of access points has a highest quality link with a client device, comprising:
   at least one of the plurality of access points receiving a probe request from the client device;
   each access point that receives the probe request, estimating a link quality between the access point and the client device;
   each access point that receives the probe request, delaying a probe response depending upon the link quality between the access point and the client device;
   each access node transmitting the response to the probe request, if the access node does receive a probe response to the client device from another access node within the delay time, and the quality of the link between the access node and the client device is better than a link quality between the other access node and the client device.

7. The method of claim 6, wherein the link quality is estimated by a received signal received signal strength at the access point.

8. The method of claim 6, further comprising the link quality being influenced by a network quality parameter of the access point.

9. A method of an access node within a wireless mesh network determining whether to transmit a response to a client device probe request, comprising:
- the access node receiving a probe request from a client device;
- the access node determining a quality of a link between the access node and the client device based on the probe request;
- the access point setting a delay time for transmitting a probe response to the probe request depending upon the quality of the link; wherein the probe response includes the quality of the link;
- the access node transmitting the response to the probe request, if the access node does receive a probe response to the client device from another access node within the delay time, and the quality of the link between the access node and the client device is better than a link quality between the other access node and the client device.

10. The method of claim 9, wherein determining a quality of the link between the access node and the client device based on the probe request comprises measuring received signal strength of the probe request.

11. The method of claim 10, wherein determining a quality of the link between the access node and the client device further includes a network quality parameter of the access node.

12. The method of claim 11, wherein the network quality parameter of the access node include at least one of a path quality of the access node to a wireless mesh network gateway, a latency of the access node, a backhaul bandwidth of the access node.

13. The method of claim 11 wherein the network quality parameter comprises a quality of a routing path of the access node to a default gateway of the access node.

14. The method of claim 13, wherein the quality of the routing path is determined by a persistence of routing beacons originating at the default gateway.

15. The method of claim 9, wherein determining a quality of the link between the access node and the client device based on the probe request comprises measuring received signal strength of the probe request.

16. The method of claim 15, wherein determining a quality of the link between the access node and the client device further includes a network quality parameter of the access node, wherein the network quality parameter of the access node include at least one of a path quality of the access node to a wireless mesh network gateway, a latency of the access node, a backhaul bandwidth of the access node.

* * * * *